United States Patent Office 3,355,972
Patented Dec. 5, 1967

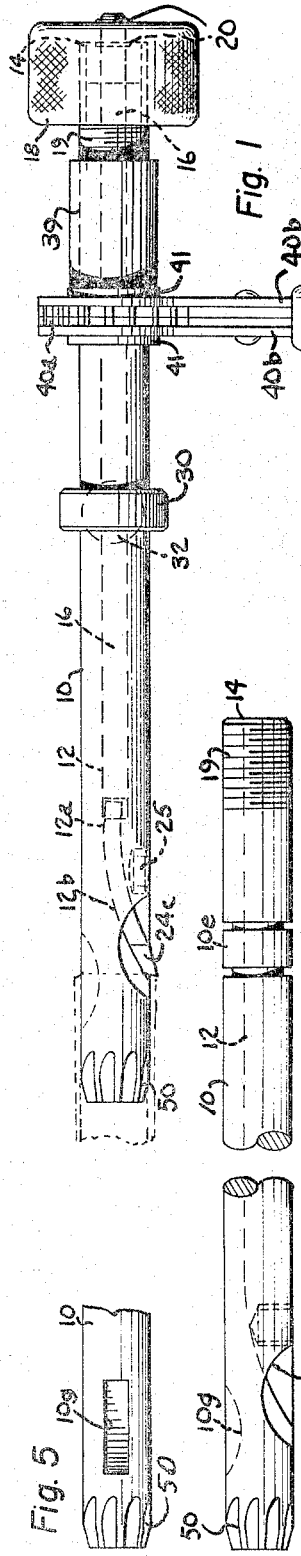

3,355,972
INSIDE TUBE CUTTER
Anton J. Janik, Elyria, Ohio, assignor to Emerson Electric Co., St. Louis, Mo., a corporation of Missouri
Filed Apr. 13, 1967, Ser. No. 630,764
13 Claims. (Cl. 82—82)

ABSTRACT OF THE DISCLOSURE

A cylindrical body, of a diameter to enable it to be inserted within a tube, is provided with a longitudinally extending straight channel in which a feed rod is slidably disposed. The end of the channel merges with a second channel having a curved bottom wall and a curved cutter bit is disposed in this channel with its inner end in interlocking engagement with the feed rod. The feed rod is moved longitudinally in the channel by a screw means on the end of the body whereby the arcuate cutter bit may be advanced outwardly in an arcuate path, with its cutting end into engagement with the inside wall of the tube. Wrench means is provided for rotating the body to cause said bit to cut the tube from the inside out.

---

In the plumbing field, it frequently becomes necessary to cut off a portion of pipe or tubing after it has been installed to enable a fixture to be properly connected therewith. In many such instances the quarters are so close that a conventional cutter is difficult, if not impossible, to use.

Heretofore it has been proposed to provide inside tube cutters which may be inserted into tubes from the end and then rotated and a cutter means advanced into engagement with the inner wall of the tube, to cut the tube from the inside out. Mostly these cutters included means for moving outward a cutter bit or a pair of cutter wheels. Such devices tended to distort the pipe outwardly at the place where it is being cut, leaving a flange on the end of the remaining tube part which interfered with the subsequent assembly of a fixture with the tube.

In addition to the above, the mechanism briefly described above was difficult and expensive to make. There were also limitations as to size, that is they could not be as small as desired when it is necessary to cut the smaller sizes of tubing.

The present invention contemplates an inside tubing cutter which may be made very economically. Its construction is very simple, having but a few moving parts which are easy to assemble and replace.

Still other advantages of the invention and the invention itself will become more apparent from the following description of an embodiment thereof, illustrated by the accompanying drawings, which form a part of this specification.

In the drawings:
FIG. 1 is an elevational view of a device constructed according to the invention;
FIG. 2 is a view of the body portion prior to assembly of the other parts therewith;
FIG. 3 is a similar view with the body rotated on the axis 90°;
FIG. 4 is an end view of the body;
FIG. 5 is a fragmentary view of the left end rotated on its axis 90° to FIG. 2 in the opposite direction to FIG. 3;
FIG. 6 is an enlarged view of the cutter bit;
FIG. 7 is a view of the cutter bit rotated 90°;
FIG. 8 is an enlarged view of the feed rod;
FIG. 9 is an edge view of a ratchet handle without the handgrip used with the cutter; and
FIG. 10 is a view along the line 10—10 of FIG. 9.

Referring to the drawings, throughout which like parts are designated by like reference characters, as best shown in FIG. 1 the cutter includes a body 10 of elongated cylindrical formation. Extending longitudinally of the body is a channel 12 which opens through the end 14 and has generally straight bottom and parallel side walls to the point 12a where it starts to and curves outwardly at 12b, toward and to the outer surface of the body, in a true arc.

A feed rod 16, of square cross-section, FIG. 8, is disposed in the straight portion of the channel 12. It is moved longitudinally in the channel by a feed knob 18 which is in threaded engagement with the threaded end 19 of the body 10, the end 16a of the rod, which is of round cross-section at this point, extending loosely through the knob and being captured by a pair of C rings 20 disposed on opposite sides of the knob in grooves 16b in the rod.

A cut-off tool or bit 24, FIGS. 6 and 7, having the same curvature as the wall 12b is disposed in the channel. The ends of the bit and the feed rod are provided with interlocking tongues and grooves 24a and 24b in the bit and 16c and 16d in the rod whereby when the rod is moved backward and forward the bit is also moved with it. The fit between the tongues and grooves is such as to prevent binding as the bit is moved in its arcuate path. The end of the bit is ground to provide a cutting face at 24c. A screw 25 threaded into the body at the channel 12b engages with the inner surface of the bit body to hold it in the channel.

A stop collar 30 is provided disposed on the body and having a thumb screw 32, the end of which engages with the body 10 in a shallow channel 10d extending lengthwise of the rod 90° from the channel 12. This collar may therefore be locked to the body at any position along the body and when locked regulates the depth to which the tool may be inserted in the tube and holds the tool in the proper position, relative to the end of the tube, for the cutting operation. The exterior of the body may be provided with inch markings, if desired.

The body may be turned by a ratchet type of handle 40, FIGS. 1, 9 and 10, which has a ratchet head 40a secured on the portion 10e of the body by C rings 41.

Although many different types of ratchet handles may be used, I prefer a simplified form of non-removable one-way ratchet, which comprises a pair of stamped plates 40b held in spaced relation to each other by headed and shouldered spacers 40c and carrying on one end in aligned apertures 40d between the plates 40b a ratchet wheel 40e which has a tongue 40f engaged in the groove or channel 12. This tongue also holds the feed rod 16 in the channel. A pawl 40g is mounted on one of the spacers and is held with its ratchet engaging end against the periphery of the ratchet wheel by a spring 40h, disposed in an arcuate opening 40i in the pawl, with one end engaged with a stop pin 40j and the other end against the end of the opening 40i. It will be noted that since the ratchet handle is not normally intended to be removed from the body of the tool it can only ratchet in one direction, assuring that the tool will always be operated in the correct direction to effect the cutting operation.

A sleeve 39 of plastic tubing may be placed on the body between the knob 18 and the ratchet head 40a and provide protection for the fingers and a stop for the knob, preventing the threads from jamming.

The body adjacent the cutter bit is milled away at 10f to provide ample room for chip clearance and a pocket into which such chips as there are may accumulate. It is contemplated that the pocket may be filled with grease to catch and hold the chips.

In operation a pipe to be cut is measured from the end to the point where the cut is to be made. The collar is then set and locked to this length which may be indicated by the exterior markings. The feed rod is retracted until the cutter bit is drawn into the body so that the cutting edge does not interfere with the insertion of the body into the tube. The body is then inserted in the tube until the stop collar engages the end of the tube. The knob 18 is then rotated clockwise which causes the feed rod to be moved to the left, as viewed in the drawings, and the cutter bit moves in the arcuate channel until the cutting tip engages with the inner wall of the tube. Then the entire body is rotated by the ratchet and the knob 18 gradually turned as the rotation of the tool is continued to cause the cutting end of the bit to cut into the wall of the tube.

The threads on the part 19 may be right or left hand threads. When left hand threads are used one hand operation may be effected because the cutting bit may be advanced on the return stroke of the ratchet handle.

As can best be seen in FIG. 1, when the tube has just been severed the action of the bit is such as to cause the pipe to be cut with a chamfer on the remaining end of the pipe that is to be attached to a fixture or a coupling. This also assures that there will be no outwardly extending fin that must be subsequently removed.

During the cutting operation, the side wall of the channel 12b opposite the pocket 10f provides lateral support for the end portion of the bit. The screw 25 being in sliding engagement with the inner curved surface of the bit holds it in guided engagement with the curved bottom wall.

It will be apparent that the action of the bit is such that a fin could be thrown up on the inner side of the tube wall. In order to remove such a fin if it should exist, the body 10 is provided with a milled recess 10g, the edges of which are sharp. The pressure of the bit against the wall on one side causes the side of the body to ride against the inner wall of the tube on the opposite side and the sharp edge of the wall defining the recess 10g removes this fin.

The end of the tool may be formed to provide reaming flutes 50 which enables it to be easily inserted into tubes that have been distorted on the end.

Having thus described the invention in some embodiments thereof, I am aware that numerous and extensive departures may be made therefrom without departing from the spirit or scope of the invention as defined in the appended claims.

I claim:

1. A tubing cutter for cutting a tube from the inside outward comprising a body for insertion into a tube from the end, a curved cutter bit guiding channel formed in said body and extending outwardly through the side of said body and providing an arcuate cutter bit guiding surface, an arcuate shaped cutter bit disposed in cutter bit channel and in engagement with the arcuate guiding surface, means for moving said cutter bit in said channel outwardly into engagement with a tube wall, and means on said body for rotating the body.

2. A device as described in claim 1, wherein a longitudinally extending channel is formed as a continuation of said curved channel and the means for moving the cutter bit comprising a feed rod disposed in said last channel and connected to said cutter bit.

3. A device as described in claim 1, wherein retainer means is provided for engagement with said cutter bit to hold it against lateral movement in said channel.

4. A device as described in claim 1, wherein said body is formed with a reaming surface on the opposite side from said cutter bit.

5. A device as described in claim 1, wherein a chip receiving pocket is provided in communication with said arcuate channel on the side in the direction of intended rotation of said cutter.

6. A device as described in claim 1, wherein said body rotating means comprises a one-way ratchet means.

7. A device as described in claim 3, wherein said retaining means comprises screw means threaded into the body in said second channel and engaging with the inner arcuate surface of said bit.

8. A device as described in claim 5, wherein said arcuate bottom wall and said straight guide wall have guiding engagement with and support for said cutter bit.

9. A device as described in claim 6, wherein said ratchet means is held in captured relation on said body.

10. A device as described in claim 9, wherein said ratchet means has a tongue extending into said longitudinally extending channel.

11. A device as described in claim 2 wherein said body rotating means comprises a ratchet wheel mounted on said body and having a tongue extending into said longitudinally extending channel, handle means associated with said ratchet wheel and pawl means carried by said handle and engaging said ratchet wheel.

12. A device as described in claim 11 wherein means is provided for holding said ratchet handle against longitudinal movement on said body.

13. A device as described in claim 12 wherein said handle means included a head portion rotatably mounted on the body and disposed on opposite side of said ratchet wheel.

References Cited

UNITED STATES PATENTS

| | | | |
|---|---|---|---|
| 605,893 | 6/1898 | Mueller | 77—73 |
| 700,118 | 5/1902 | Hathorn | 82—82 |
| 1,088,135 | 2/1914 | Fagan | 82—82 X |
| 2,373,474 | 4/1945 | Heyer | 77—73 |
| 3,172,309 | 3/1965 | Cogsdill | 77—73 X |

HARRISON L. HINSON, *Primary Examiner.*